(12) United States Patent
Bottome

(10) Patent No.: US 8,753,094 B2
(45) Date of Patent: Jun. 17, 2014

(54) GAS TURBINE ENGINE NOSE CONE

(75) Inventor: Kristofer J. Bottome, Nottingham (GB)

(73) Assignee: Rolls-Royce PLC, London (GB)

( * ) Notice: Subject to any disclaimer, the term of this patent is extended or adjusted under 35 U.S.C. 154(b) by 527 days.

(21) Appl. No.: 13/044,964

(22) Filed: Mar. 10, 2011

(65) Prior Publication Data

US 2011/0236217 A1    Sep. 29, 2011

(30) Foreign Application Priority Data

Mar. 26, 2010 (GB) .................................. 1005053.2

(51) Int. Cl.
     *F01D 25/00*      (2006.01)

(52) U.S. Cl.
     USPC ..................................................... 416/245 R

(58) Field of Classification Search
     USPC ............... 416/245 R, 146 R, 224, 229 A, 230
     See application file for complete search history.

(56) References Cited

U.S. PATENT DOCUMENTS

| | | | |
|---|---|---|---|
| 3,428,270 A * | 2/1969 | Knight et al. .................. | 244/1 A |
| 4,393,650 A * | 7/1983 | Pool ............................ | 60/39.093 |
| 5,149,251 A * | 9/1992 | Scanlon et al. ............ | 416/245 R |
| 6,447,255 B1 * | 9/2002 | Bagnall et al. ............. | 416/245 R |
| 7,377,750 B1 * | 5/2008 | Costin et al. ............... | 416/146 R |
| 8,616,854 B2 * | 12/2013 | Mahan ....................... | 416/245 R |
| 2008/0022524 A1 | 1/2008 | Schreiber | |
| 2009/0258220 A1 * | 10/2009 | Schaaf et al. ................. | 428/332 |

FOREIGN PATENT DOCUMENTS

| | | |
|---|---|---|
| DE | 38 33 290 A1 | 4/1990 |
| GB | 902268 | 8/1962 |
| GB | 1092939 A | 11/1967 |

OTHER PUBLICATIONS

Search Report issued in United Kingdom Patent Application No. GB 1005053.2 dated Jun. 9, 2010.

* cited by examiner

*Primary Examiner* — Nathaniel Wiehe
*Assistant Examiner* — Eldon Brockman
(74) *Attorney, Agent, or Firm* — Oliff PLC

(57) ABSTRACT

A gas turbine engine nose cone assembly (40) comprises a tapering spinner (42). The tapering spinner (42) has a point (44) at a first end (46) and a circular base (48) at a second end (50). The tapering spinner (42) comprises a carbon fiber containing composite material layer (70), an electrically insulating layer (74) arranged on an inner surface (72) of the carbon fiber containing composite material layer (70), an electrically conducting layer (78) arranged on an inner surface (76) of the electrically insulating layer (74) and an electrically conducting member (80) extends through the first end of the tapering spinner (42) and is connected to the electrically conducting layer (78). This arrangement provides lightning protection for the gas turbine engine nose cone assembly (40).

21 Claims, 2 Drawing Sheets

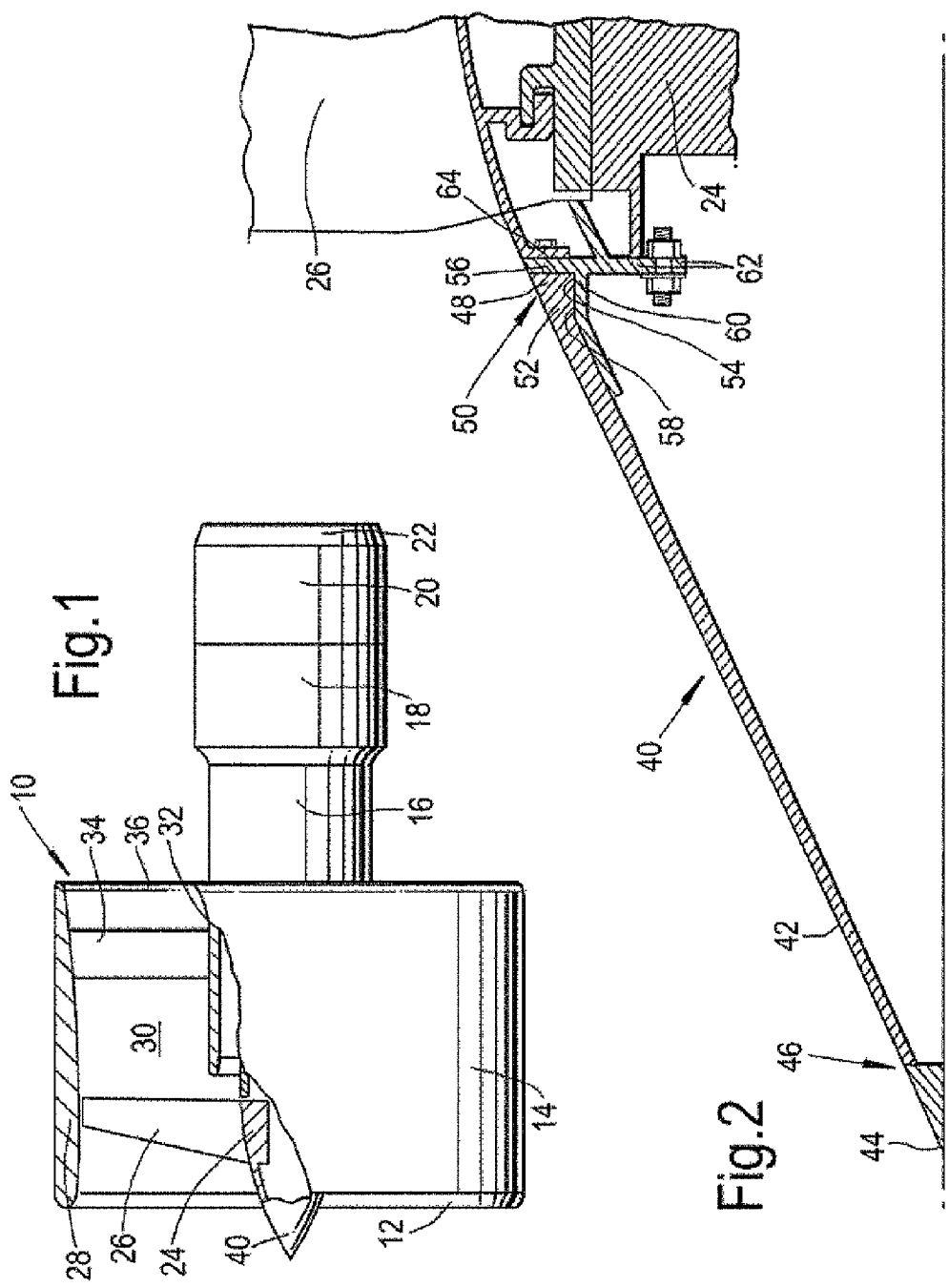

GAS TURBINE ENGINE NOSE CONE

The present invention relates to a gas turbine engine nose cone and in particular to a turbofan gas turbine engine nose cone.

It is known to provide gas turbine engine nose cones comprising glass fibre containing composite material. Glass fibre containing composite material has the advantage of a relatively high strain to failure rate. However, glass fibre containing composite material has a relatively low fatigue strength and is relatively dense for a composite material.

It has been suggested to provide a gas turbine engine nose cone comprising carbon fibre and glass fibre containing composite material. Carbon fibre and glass fibre containing composite material has improved strength, improved fatigue strength and good impact performance.

A problem with a gas turbine engine nose cone comprising carbon fibre and glass fibre containing composite material is that it is susceptible to lightning strikes, because carbon fibres are conductive there is a risk that the gas turbine engine nose cone may be struck by lightning. If the carbon fibre and glass fibre containing composite material gas turbine engine nose cone is struck by lightning there is no low electrical resistance path for the electricity to follow so the gas turbine engine nose cone may be damaged by a lightning strike.

Accordingly the present invention seeks to provide a novel gas turbine engine nose cone which reduces, preferably overcomes, the above mentioned problems.

Accordingly the present invention provides a gas turbine engine nose cone comprising a tapering spinner, the tapering spinner having a point at a first end and a circular base at a second end, the tapering spinner comprising a carbon fibre containing composite material layer, an electrically insulating layer being arranged on an inner surface of the carbon fibre containing composite material layer, an electrically conducting layer being arranged on an inner surface of the electrically insulating layer and an electrically conducting member extending through the first end of the tapering spinner and being connected to the electrically conducting layer.

The electrically conducting layer may comprise a metallic layer. The electrically conducting layer may comprise a metallic mesh. The electrically conducting layer may comprise copper or aluminium.

The electrically conducting member may comprise a metallic member. The metallic member may comprise copper or aluminium.

The electrically insulating layer may comprise a glass fibre containing composite material layer. The glass fibre containing composite material layer may comprise glass fibre in an epoxy resin or glass fibres in a polyester resin, vinyl ester resin, bismaleimide resin or other thermosetting resin.

The carbon fibre containing composite material layer may comprise carbon fibres in an epoxy resin, glass fibres and carbon fibres in an epoxy resin, carbon fibres in a poly-ether-ether-ketone matrix or carbon fibres and glass fibre in a poly-ether-ether-ketone matrix.

The electrically insulating layer may comprise a glass fibre containing composite material layer, the electrically conducting layer comprises a metallic mesh and the electrically conducting member comprises a metallic member.

The first end of the tapering spinner may have a rubber tip and the electrically conducting member extends through the rubber tip.

The electrically conducting member may comprise a conical member, a disc member and a reduced cross-sectional area member extending coaxially between the conical member and the disc member and the rubber tip is positioned radially around the reduced cross-sectional area member and axially between the disc member and the conical member.

The carbon fibre containing composite material layer, the electrically insulating layer and the electrically conducting layer may be co-moulded together to produce the gas turbine engine nose cone.

Alternatively the electrically insulating layer may be bonded to the carbon fibre containing composite material layer and the electrically conducting layer may be bonded to the electrically insulating layer to produce the gas turbine engine nose cone.

The present invention will be more fully described by way of example with reference to the accompanying drawings, in which:—

FIG. 1 is a turbofan gas turbine engine having a gas turbine engine nose cone according to the present invention.

FIG. 2 is an enlarged longitudinal cross-sectional view through a gas turbine engine nose cone shown in FIG. 1.

Figure 3:
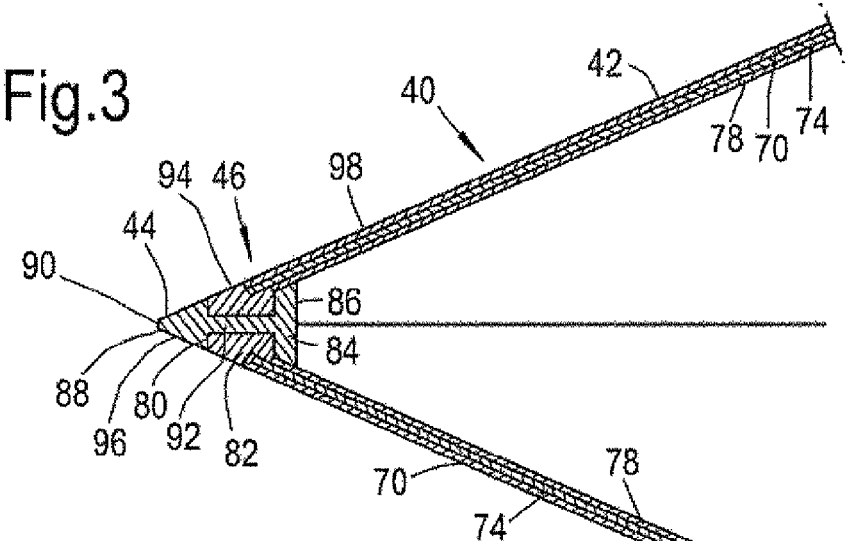
FIG. 3 is a further enlarged cross-sectional view through a portion of an upstream end of the gas turbine engine nose cone shown in FIG. 2.

A turbofan gas turbine engine 10, as shown in FIG. 1, comprises in flow series an intake 12, a fan section 14, a compressor section 16, a combustion section 18, a turbine section 20 and an exhaust 22. The compressor section 16 comprises one or more compressors arranged to be driven by one or more turbines in the turbine section 20 via shafts (not shown). The fan section 14 is driven by a turbine in the turbine section 20 via a shaft (not shown). The fan section 14 comprises a fan rotor 24 carrying a plurality of circumferentially spaced radially outwardly extending fan blades 26. The fan rotor 24 and fan blades are surrounded by a fan casing 28 and the fan casing 28 defines the radially outer surface of a fan duct 30. The fan casing 28 is supported from a core engine casing 32 by a plurality of radially extending fan outlet guide vanes 34. The fan duct 30 has an outlet 36.

The gas turbine engine 10 operates quite conventionally in that air enters the intake 12 and is initially compressed by the fan section 14. A portion of the air flows through the fan duct 30 and the outlet 30 to provide thrust. The remainder of the air is compressed by the compressor section 16 and is supplied to the combustion section 18. Fuel is supplied to the combustion section 18 and is burnt in the combustion section 18 to produce hot gases. The hot gases flow through, and drive, the turbine section 20 and then flow through the exhaust 22 to produce further thrust. The turbine section 20 in turn drives the fan section 14 and compressor section 16.

The fan section 14 and in particular the fan rotor 24 and nose cone assembly 40 are shown more clearly in FIGS. 2, 3, 4 and 5. The nose cone assembly 40 comprises a conical spinner 42, a tapering spinner, which is removably secured to the upstream end of the fan rotor 24. The conical spinner 42 has a point, an apex, 44 at an upstream, first, end 46 and a circular base 48 at a downstream, second, end 50. The circular base 48 of the conical spinner 42 forms a spigot 52 and the spigot 52 has a radially inner cylindrical face 54 facing radially inwardly and at its downstream end a radial face 56 facing in a downstream direction, as shown more clearly in FIG. 5. The radially inner cylindrical face 54 of the spigot 52 is removably located and abuts against a radially outer cylindrical face 58 of an axially extending flange 60 on a support ring 62. The radially inner cylindrical face 54 of the spigot 52 and the radially outer cylindrical face 58 of the flange 60 of the support ring 62 have substantially the same diameter. The radial face 56 of the spigot 52 is removably located and abuts against a radial face 64 facing in an upstream direction on the support ring 62. The support ring 62 is secured to the fan rotor 24 by suitable fasteners, e.g. nuts and bolts, and the nose cone assembly 40 is secured to the support ring 62 by suitable fasteners, e.g. nuts and bolts. The support ring 62 and the fan rotor 24 are metallic.

The nose cone assembly 40 may be secured to the support ring 62 using a plurality of circumferentially spaced brackets in which the nose cone assembly 40 is secured to the brackets by fasteners, e.g. nuts and bolts, and the brackets are secured to the support ring 62 and the fan rotor 24 by fasteners, e.g. nuts and bolts, as described in our published UK patent application GB2363170A. Alternatively the nose cone assembly 40 may be secured to the support ring 62 using a plurality of circumferentially spaced members which are integral with the support ring 62 and which are rigid in an axial direction and flexible in a radial direction and the nose cone assembly 40 is secured to the members by fasteners, e.g. nuts and bolts, and the support ring 62 is secured to the fan rotor 24 by fasteners, e.g. nuts and bolts, as described in our published EP patent application EP2096029A2.

Figure 4:
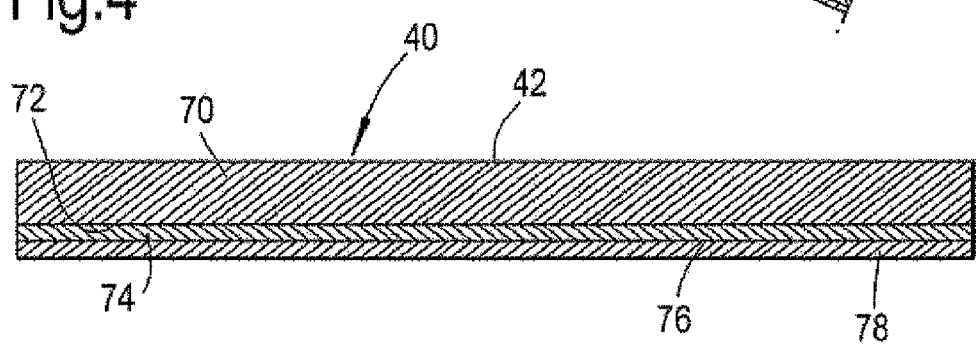
FIG. 4 is a further enlarged cross-sectional view through a portion of a mid portion of the gas turbine engine nose cone shown in FIG. 2.
Figure 5:
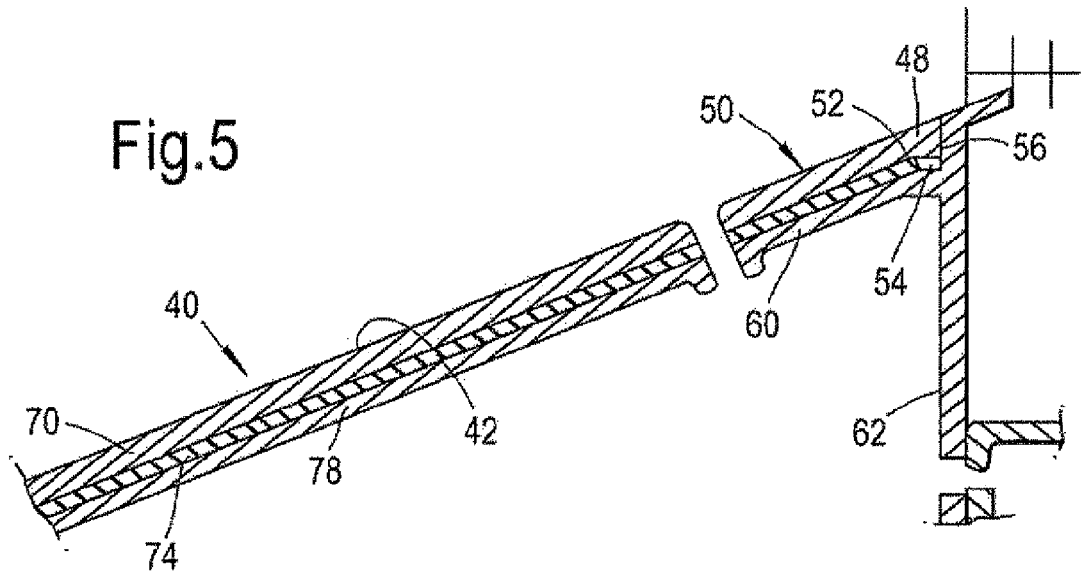
FIG. 5 is a further enlarged cross-sectional view through a portion of a downstream end of the gas turbine engine nose cone shown in FIG. 2.

The conical spinner 42 comprises a carbon fibre containing composite material layer 70, an electrically insulating layer 74 is arranged on an inner surface 72 of the carbon fibre containing composite material 70, an electrically conducting layer 78 is arranged on an inner surface 76 of the electrically insulating layer 74 and an electrically conducting member 80 extends through the first end 46 of the conical spinner 42 and is connected to the electrically conducting layer 78 as shown in FIG. 4. The apex 44 at the first end 46 of the conical spinner 42 has a rubber tip 82 and the electrically conducting member 80 extends through the rubber tip 82, as shown more clearly in FIG. 3. The rubber tip 82 is secured to the carbon fibre containing composite material layer 70. The electrically conducting member 80 comprises a disc member 84 at its downstream end 86 and a conical member 88 at its upstream end 90 with a reduced cross-sectional area portion 92 extending coaxially between the disc member 84 and the conical member 88. The rubber tip 82 is positioned radially around the reduced cross-sectional area portion 92 and axially between the disc member 84 and the conical member 88. The rubber tip 82 has a conical surface 94 which is arranged flush with the conical surfaces 96, 98 of the conical member 88 and the conical spinner 42. The electrically conducting layer 78 is connected to the disc member 84. The electrically insulating layer 74 and the electrically conducting layer 78 extend substantially the length of the conical spinner 42 from the first end 44 to the second end 50 of the conical spinner 42.

The electrically conducting layer 78 comprises a metallic member, preferably a metallic mesh. The metallic mesh may comprise a copper mesh or an aluminium mesh. The electrically conducting member 80 comprises a metallic member. The metallic member may comprise copper or aluminium.

The electrically insulating layer 74 comprises a glass fibre containing composite. The glass fibre containing composite may comprise glass fibre in an epoxy resin or glass fibres in any other thermosetting matrix, e.g. polyester resin, vinyl ester resin or bismaleimide resin.

The carbon fibre containing composite material layer 70 comprises carbon fibres in an epoxy resin, glass fibres and carbon fibres in an epoxy resin, carbon fibres in a poly-ether-ether-ketone (PEEK) matrix or carbon fibres and glass fibre in a poly-ether-ether-ketone (PEEK) matrix or other suitable thermoplastic matrix.

The electrically conducting layer 78, metallic member e.g. metallic mesh, is either co-moulded into the gas turbine engine nose cone assembly 40 or is bonded to the gas turbine engine nose cone assembly 40. The electrically insulating layer 74, glass fibre containing composite layer, is either co-moulded into the gas turbine engine nose cone assembly 40 or is bonded to the gas turbine engine nose cone assembly 40. Thus, the carbon fibre containing composite material layer 70, the electrically insulating layer 74, e.g. the glass fibre containing composite layer, and the electrically conducting layer 78, e.g. the metallic member or metallic mesh, may be co-moulded together to produce the gas turbine engine nose cone assembly 40. The electrically insulating layer 74, e.g. the glass fibre containing composite layer, may be bonded to the carbon fibre containing composite material layer 70 and the electrically conducting layer 78, e.g. the metallic member or metallic mesh, may be bonded to the electrically insulating layer 74.

There may be a polyurethane layer on an outer surface of the carbon fibre containing composite material 70 of the gas turbine engine nose cone assembly 40.

The rubber tip 82 is allowed to flex in order to shed ice from the conical spinner 42.

The apex 44 at the first end 46 of the conical spinner 42 is the most likely point of attachment of a lightning strike on the conical spinner 42. The electricity from a lightning strike is conducted by the electrically conducting member 80 through the rubber tip 82 and to the electrically conducting layer 78 on the inner surface of the conical spinner 42. The electricity is then conducted from the electrically conducting layer 78 into the support ring 62. It is to be noted that the electrically conducting layer 78 is clamped against the support ring 62, to ensure that the electrically conducting layer 78 is on contact with the support ring 62 to provide an electrical path therebetween, by the tightened fasteners at the downstream end 50 of the conical spinner 42. The electrically conducting layer 78 is electrically insulated from the carbon fibre containing composite material layer 70 by the electrically insulating layer 74 to provide electrical insulation and to avoid galvanic corrosion of the electrically conducting layer 78, especially if the electrically conducting layer comprises aluminium. The carbon in the carbon fibre containing composite material layer 70 of the conical spinner 42 reduces, or prevents, the build up of static electricity in the conical spinner 42 because it provides a minor electrically conductive path, but has too high a resistance to conduct electricity during a lightning strike. The metallic mesh on the inner surface of the conical spinner 42 is able to move relative to the conical spinner 42, is able to be vapourised and is able to allow a shock wave to pass therethrough without damaging the conical spinner 42, or gas turbine engine nose cone assembly 40. The support ring 62 is provided with apertures, not shown, to allow gas to escape from the interior of the conical spinner 42 to prevent a build of gas pressure in the conical spinner 42. It is possible to repair, or replace, the electrically conducting layer 78 on the conical spinner 42 of the gas turbine engine nose cone assembly 40 without having to replace the whole of the gas turbine engine nose cone assembly 40. Similarly it is possible to repair the conical spinner 42 of the gas turbine engine nose cone assembly 40 without having to remove the electrically conducting layer 78.

Although the present invention has been described with reference to an electrically conducting member extending through a rubber tip at the upstream end of the conical spinner, it is equally possible to simply provide an electrically conducting member extending directly through the upstream end of the conical spinner.

The invention claimed is:

1. A gas turbine engine nose cone comprising a tapering spinner, the tapering spinner having a point at a first end and a circular base at a second end, the tapering spinner comprising a carbon fiber containing composite material layer having an inner surface, an electrically insulating layer having an inner surface, an electrically conducting layer and an electrically conducting member, the electrically insulating layer being arranged on the inner surface of the carbon fiber containing composite material layer, the electrically conducting layer being arranged on the inner surface of the electrically insulating layer and the electrically conducting member extending through the first end of the tapering spinner and being connected to the electrically conducting layer,
wherein the first end of the tapering spinner has a rubber tip and the electrically conducting member extends through the rubber tip, and
wherein the electrically conducting member comprises a conical member, a disc member and a reduced cross-sectional area member, the reduced cross-sectional area member extending coaxially between the conical member and the disc member, and the rubber tip is positioned radially around the reduced cross-sectional area member and axially between the disc member and the conical member.

2. A gas turbine engine nose cone as claimed in claim 1 wherein the electrically conducting layer comprises a metallic layer.

3. A gas turbine engine nose cone as claimed in claim 1 wherein the electrically conducting layer comprises a metallic mesh.

4. A gas turbine engine nose cone as claimed in claim 1 wherein the electrically conducting layer is selected from the group consisting of copper and aluminum.

5. A gas turbine engine nose cone as claimed in claim 1 wherein the electrically conducting member comprises a metallic member.

6. A gas turbine engine nose cone as claimed in claim 5 wherein the metallic member is selected from the group consisting of copper and aluminum.

7. A gas turbine engine nose cone as claimed in claim 1 wherein the electrically insulating layer comprises a glass fiber containing composite material layer.

8. A gas turbine engine nose cone as claimed in claim 7 wherein the glass fiber containing composite material layer is selected from the group consisting of glass fibers in an epoxy resin, glass fibers in a polyester resin, glass fibers in a vinyl ester resin, glass fibers in a bismaleimide resin and glass fibers in another thermosetting resin.

9. A gas turbine engine nose cone as claimed in claim 1 wherein the carbon fiber containing composite material layer is selected from the group consisting of carbon fibers in an epoxy resin, glass fibers and carbon fibers in an epoxy resin, carbon fibers in a poly-ether-ether-ketone matrix and carbon fibers and glass fiber in a poly-ether-ether-ketone matrix.

10. A gas turbine engine nose cone as claimed in claim 1 wherein the electrically insulating layer comprises a glass fiber containing composite material layer, the electrically conducting layer comprises a metallic mesh and the electrically conducting member comprises a metallic member.

11. A gas turbine engine nose cone as claimed in claim 1 wherein the carbon fiber containing composite material layer, the electrically insulating layer and the electrically conducting layer are co-molded together to produce the gas turbine engine nose cone.

12. A gas turbine engine nose cone as claimed in claim 1 wherein the electrically insulating layer is bonded to the carbon fiber containing composite material layer and the electrically conducting layer is bonded to the electrically insulating layer to produce the gas turbine engine nose cone.

13. A gas turbine engine nose cone comprising a tapering spinner,
the tapering spinner having a point at a first end and a circular base at a second end,
the tapering spinner comprising a carbon fiber containing composite material layer having an inner surface, an electrically insulating layer having an inner surface, an electrically conducting layer and an electrically conducting member,
the electrically insulating layer being arranged on the inner surface of the carbon fiber containing composite material layer,
the electrically conducting layer being arranged on the inner surface of the electrically insulating layer,
the electrically conducting member extending through the first end of the tapering spinner and being electrically connected to the electrically conducting layer,
the first end of the tapering spinner having a rubber tip and the electrically conducting member extending through the rubber tip,
the electrically conducting member comprising a conical member, a disc member and a reduced cross-sectional area member, the reduced cross-sectional area member extending coaxially between the conical member and the disc member, the disc member being positioned within the tapering spinner, the electrically conducting layer being directly connected to the disc member of the electrically conducting member, and
the rubber tip being positioned radially around the reduced cross-sectional area member and axially between the disc member and the conical member.

14. A gas turbine engine nose cone as claimed in claim 13, wherein the conical member has a conical surface, the tapering spinner has a conical outer surface and the rubber tip has a conical surface, the conical surface of the rubber tip is arranged flush with the conical surface of the conical member and the conical outer surface of the tapering spinner.

15. A gas turbine engine nose cone as claimed in claim 13, wherein the rubber tip is secured to the carbon fiber containing composite material layer.

16. A turbofan gas turbine engine including a metallic fan rotor and a nose cone, the nose cone comprising a tapering spinner,
the tapering spinner having a point at a first end and a circular base at a second end,
the tapering spinner comprising a carbon fiber containing composite material layer having an inner surface, an electrically insulating layer having an inner surface, an electrically conducting layer and an electrically conducting member,
the electrically insulating layer being arranged on the inner surface of the carbon fiber containing composite material layer,
the electrically conducting layer being arranged on the inner surface of the electrically insulating layer,
the electrically conducting member extending through the first end of the tapering spinner and being electrically connected to the electrically conducting layer,
the nose cone being secured to the fan rotor, and the electrically conducting layer being electrically connected to the fan rotor.

17. A turbofan gas turbine engine as claimed in claim 16, wherein
- the first end of the tapering spinner includes a rubber tip and the electrically conducting member extends through the rubber tip,
- the electrically conducting member comprises a conical member, a disc member and a reduced cross-sectional area member, the reduced cross-sectional area member extends coaxially between the conical member and the disc member, the disc member is positioned within the tapering spinner, the electrically conducting layer is directly electrically connected to the disc member of the electrically conducting member, and
- the rubber tip is positioned radially around the reduced cross-sectional area member and axially between the disc member and the conical member.

18. A turbofan gas turbine engine as claimed in claim 16 wherein the nose cone is secured to a metallic support ring and the support ring is secured to the fan rotor, and the electrically conducting layer is electrically connected to the support ring.

19. A turbofan gas turbine engine as claimed in claim 16 wherein the electrically conducting layer comprises a metallic layer, the electrically conducting member comprises a metallic member and the electrically insulating layer comprises a glass fiber containing composite material layer.

20. A turbofan gas turbine engine as claimed in claim 16 wherein the electrically insulating layer comprises a glass fiber containing composite material layer.

21. A turbofan gas turbine engine as claimed in claim 20 wherein the glass fiber containing composite material layer is selected from the group consisting of glass fibers in an epoxy resin, glass fibers in a polyester resin, glass fibers in a vinyl ester resin, glass fibers in a bismaleimide resin and glass fibers in another thermosetting resin and the carbon fiber containing composite material layer is selected from the group consisting of carbon fibers in an epoxy resin, glass fibers and carbon fibers in an epoxy resin, carbon fibers in a poly-ether-ether-ketone matrix and carbon fibers and glass fibers in a poly-ether-ether-ketone matrix.

* * * * *